(12) United States Patent
Metcalf et al.

(10) Patent No.: US 6,419,017 B1
(45) Date of Patent: Jul. 16, 2002

(54) METHOD OF PREVENTING GAS BREAKTHROUGH IN AN OIL BEARING FORMATION

(75) Inventors: Arthur Steven Metcalf, Tomball; Jeffrey C. Dawson, Spring, both of TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/666,043

(22) Filed: Sep. 20, 2000

(51) Int. Cl.[7] .......................... E21B 33/00; E21B 43/00
(52) U.S. Cl. ....................... 166/295; 166/300
(58) Field of Search ................ 166/270, 285, 166/292, 295, 300, 400

(56) References Cited

U.S. PATENT DOCUMENTS

| | | | |
|---|---|---|---|
| 4,127,174 A | * | 11/1978 | Sharpe et al. ............. 166/291 |
| 4,183,406 A | * | 1/1980 | Lundberg et al. .......... 166/295 |
| 4,324,669 A | * | 4/1982 | Norman et al. |
| 4,525,285 A | * | 6/1985 | Son et al. |

* cited by examiner

Primary Examiner—David Bagnell
Assistant Examiner—Jennifer R Dougherty
(74) Attorney, Agent, or Firm—Bracewell & Patterson, LLP

(57) ABSTRACT

A method of preventing gas breakthrough in an oil well, which includes first pumping a slug of an alkaline earth salt into the well bore, followed by a slug of spacer solution, and finally a slug of a fatty acid resin. The resin can comprise at least one fatty acid, a fat (or tall oil), and other components. The resin and alkaline earth salt advantageously react in situ to form a water and gas insoluble precipitate or gum that forms a sealing zone around the oil/gas interface of the well bore, and also allows the oil to dissolve the precipitate to facilitate recovery of the oil.

25 Claims, 5 Drawing Sheets

METHOD OF PREVENTING GAS BREAKTHROUGH IN AN OIL BEARING FORMATION

BACKGROUND OF THE INVENTION

1. Field of the Invention

The present invention relates to controlling gas flow from an oil producing formation. More particularly, the present invention is a method of preventing gas escape from an oil formation by sequential injection of two reactants into the formation, the product of the reaction forming a sealing zone to prevent gas breakthrough.

2. Description of the Prior Art

Hydrocarbon producing formations typically include both a gas and a companion oil bearing zone or formation. The gas, due to its low density, tends to accumulate above the liquid hydrocarbons (oil) at a horizontal interface and form a cap. This cap exerts pressure upon the oil and facilitates the extraction of the oil once a well bore is drilled and completed to the producing interval. While it is advantageous to keep the gas within the formation during oil recovery, this is not always possible due to vertical permeability within the formation or other causes.

In a typical well completion, a production pipe or tubing extends within the well bore or casing downwardly adjacent the producing formation from the surface location. The producing interval is isolated, usually through the use of well bore packers. Perforating the well casing adjacent the oil region then permits oil to flow into the production pipe from the formation.

The motive force necessary to move oil from the subsurface formation to the well surface may be supplied in a number of ways, for example, by natural reservoir pressures or by surface or subsurface pumps. At certain production rates, however, a substantial pressure gradient may be set up radially outwardly from the well bore due to flow restriction through the minute interstices of the formation. In effect, oil is withdrawn from the space immediately about the well bore at a rate greater than that at which it is readily replenished from the surrounding formation. Therefore, the level of oil progressively decreases to below the horizontal interface of the oil and gas. Thus, oil previously present in the pores of the formation just at the interface tends to be replaced by gas which flows vertically down the formation and then into the well bore, resulting in what is known as "coning".

There are several methods of preventing coning and altering the permeability of formations. Most methods involve the formation of polymers or foams within the formation to reduce gas permeability. For example, Allen (U.S. Pat. No. 2,713,906) discloses a method of selectively blocking the formation approximately at the plane of the interface between the oil and gas cap. This blocking or plugging is achieved by localized, selective deposition of an asphaltic or bituminous material at the liquid-gas interface. This is accomplished by injecting asphaltic material into the formation just below the liquid surface as an asphalt-rich nonaqueous solution. The asphalt is then precipitated by contact with the gas within the formation to create a gas barrier.

Another method is disclosed in Raza (U.S. Pat. No. 3,616,858), in which MQ-type silicone is pumped into the formation. The silicon is pumped into a disk-shaped volume at the oil-gas interface by using packers, or injected into the entire formation. Contact between the gas and the silicon causes the silicon to foam and inhibits any further flow of gas. In another method disclosed in Boneau (U.S. Pat. No. 3,779,315), a polymeric solution is injected into the formation at a location lower in elevation than the gas cap. Gas is preferably removed from the gas cap during injection to facilitate movement of the polymeric material up into the zones of high permeability between the gas cap and the lower oil bearing portion of the formation. Preferred polymers include hydrolyzed polyacrylamides, polysaccharide carboxylmethyl cellulose and polyethylene oxide.

A method of altering the permeability of formation when other gases such as $CO_2$ are injected into the formation is disclosed by Bruning et al. (U.S. Pat. Nos. 4,569,393, and 4,657,944), in which slugs of sequentially added substances are injected into the well bore. The substances are, at least, a thickened slug of sequestered polyvalent metal cation such as aluminum and a gelable polymeric viscosifier such as polyacrylamide, and $CO_2$, to decrease the pH of the polymer slug which then induces gelation of the slug. The goal is to preferentially decrease water permeability in highly permeable zones in the formation, thus improving the efficiency of water flooding. Sandiford et al. (U.S. Pat. No. 4,673,038) also discloses a similar method using polyvinyl alcohols and other monomers with copolymers such as aldehydes to then form a polymer within the highly permeable regions of the formation. Finally, Laramay et al. (U.S. Pat. No. 5,320,173) discloses a method of preventing gas breakthrough comprising the injection of gaseous polymerizable materials such as ethylene oxide into the formation, followed by shutting the material in for a period of time to allow polymerization of the material to form a gas impermeable layer at or near the gas and oil interface.

One of the problems with preventing gas breakthrough or altering formation permeability is the fact that polymeric reactions can be complicated and difficult to control. They can be temperature sensitive, as well as pressure sensitive. Further, the materials used in these methods can be uneconomical to use. Another drawback is the insolubility of the polymers and foams with respect to the oil which can hinder oil production from parts of the formation.

What is needed is a method of preventing gas breakthrough that does not irreversibly hinder oil production, and is fast and economical to implement.

SUMMARY OF THE INVENTION

It is therefore one object of the present invention to provide an improved method of preventing gas breakthrough in hydrocarbon formations.

It is another object of the present invention to provide a means of creating a sealing zone within a gas containing oil formation that allows oil to flow through but does not allow the gas to flow.

It is yet another object of the present invention to provide a method of sealing gas within an oil well that advantageously avoids the use of polymers or foams.

These and other objects of the present invention are achieved by a method of preventing gas breakthrough in a hydrocarbon bearing formation comprising sequential injections of reactants. The method can include injecting a first reactant of a salt solution through a perforated well bore having a gas zone above an oil bearing zone. The salt solution can be alkaline earth salt solution. A spacer solution is then injected into the well bore behind the alkaline earth salt solution. Next, a second reactant of an aqueous dispersion of an oil soluble fatty acid component is injected through the well bore.

The alkaline earth salt solution and fatty acid dispersion component will react and create a precipitate or gum. The precipitate is allowed to fall by gravity through a selected region of the gas bearing zone into a selected region of the oil bearing zone to thereby form a sealed zone within the hydrocarbon bearing formation. Finally, oil is produced from the oil bearing zone through the well bore, as the fatty acid precipitate is allowed to gradually dissolve in the hydrocarbon present in the oil bearing zone as oil is being produced.

Alternately, a packer can be used to isolate the oil zone. Then, the casing above the oil zone can be perforated adjacent the gas zone. A divalent salt solution, followed by a spacer solution and then the fatty acid solution can then be injected into the gas zone. Because of their different densities, the reactants should drop into the oil zone, assuming some vertical permeability in the zones. The two reactants react to form a gas insoluble residue damaging the cone. That is, the separate reactants fall through the cone while reacting; once formed, the reaction product is a gummy, pliable reaction product. If, for some reason, the precipitate invades the oil zone, it is oil soluble and easily dissolved. Once the injection of the two reactant solutions is complete, the perforations adjacent the gas zone can be closed off, as by a squeeze cementing operation.

Typical alkaline earth salts used for the first reactant are $CaCl_2$ and $MgCl_2$, their concentrations in the first reactant being between 4 and 6 percent by weight in water in a preferred embodiment of the invention.

The "spacer solution" used between the first and second reactant solutions is typically a 2 percent by weight solution of KCl in water.

By the term "fatty acid component", it is meant a reactant component of the invention comprising at least a fatty acid. The fatty acid component can also comprise a mixture of fatty acids, and can include other components such as fats (fatty acids condensed with glycerol), $NH_4OH$, isopropyl alcohol, tall oils or "rosins" (mixtures of such components as multi-ring organic acids with fats, fatty acids, and other condensation products) or other components.

A non-limiting list of fatty acids useful as the fatty acid component of the invention includes lauric acid $\{CH_3(CH_2)_{10}COOH\}$, palmitic acid $\{CH_3(CH_2)_{14}COOH\}$, stearic acid $\{CH_3(CH_2)_{16}COOH\}$, oleic acid $\{CH_3(CH_2)_7CH=CH(CH_2)_7COOH\}$, linoleic acid $\{CH_3(CH_2)_4CH=CHCH_2CH=CH(CH_2)_7COOH\}$, linolenic acid $\{CH_3CH_2CH=CHCH_2CH=CHCH_2CH=CH(CH_2)_7COOH\}$, eleostearic acid $\{CH_3(CH_2)_3CH=CHCH=CHCH=CH(CH_2)_7COOH\}$, licanic acid $\{CH_3(CH_2)_3CH=CHCH=CHCH=CH(CH_2)_4CO(CH_2)_2COOH\}$, ricinoleic acid $\{CH_3(CH_2)_5CHCOHCH_2CH=CH(CH_2)_7COOH\}$, palmitoleic acid $\{CH_3(CH_2)_5CH=CH(CH_2)_7COOH\}$, petroselenic acid $\{CH_3(CH_2)_{10}CH=CH(CH_2)_4COOH\}$, vaccenic acid $\{CH_3(CH_2)_5CH=CH(CH_2)_9COOH\}$, and erucic acid $\{CH_3(CH_2)_7CH=CH(CH_2)_{11}COOH\}$.

Additional objects, features and advantages will be apparent in the written description which follows.

DETAILED DESCRIPTION OF THE INVENTION

Figure 4:
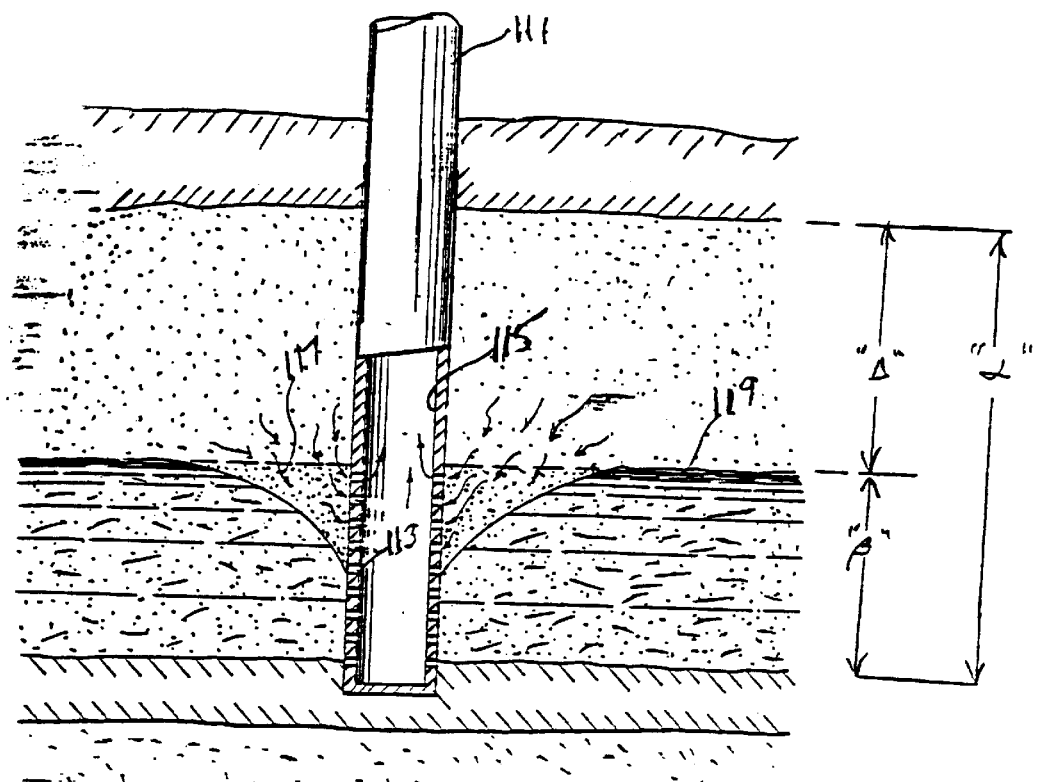
FIG. 4 is a simplified, partial sectional view of a subterranean formation of the prior art penetrated by a production pipe and showing the effects of gas coning.

The present invention is a method of preventing gas breakthrough, often referred to as gas "fingering or coning", in a hydrocarbon bearing formation. FIG. 4 is a simplified view of a typical prior art well completion showing a section of casing or tubing 111 which extends from the well surface to a producing interval, in this case α. The producing interval is comprised of a lower, predominately oil bearing region β and an upper predominately gas bearing region Δ. The casing 111 is perforated to provide apertures or openings 113 whereby oil from the region β can flow through the interior 115 of the casing 111 to the well surface. The gas cap represented by the region Δ would normally exert a positive force on the hydrocarbons in the region β, to facilitate the upward movement of the liquid hydrocarbons to the well surface.

FIG. 4 illustrates the problem toward which the present invention is directed in which gas from the region Δ preferentially forms "fingers" 117 in areas of high permeability. This fingering or coning results in gas replacing oil which would otherwise be present in the pores of the formation adjacent the interface 119 and immediately about the well bore.

The method comprises sequential injections of two reactants with a spacer therebetween. The reactants are typically spaced apart so that the first reactant is first pumped into a well bore penetrating a gaseous rich subterranean formation, followed by pumping the second reactant into the well bore, typically separated by a spacer. The product of the reaction is a precipitate "gum" that is soluble in the oils and hydrocarbons within the formation, while being stable relative to the gases within the formation. Thus, a perforated well bore having both gas and oil production can be limited to having primarily oil production, the gas being preserved within the formation to maintain pressure within the formation and facilitate the recovery of the oil.

Perforation of the cased well bore adjacent the producing formation can be carried out using commonly available techniques, such as the use of perforating guns. In one embodiment, the oil zone is initially isolated from the gas zone by means of a well bore packer. The gas area adjacent to the gas zone Δ is first perforated, followed by treatment with the method of the invention. The gas perforations are closed off, followed by perforating the oil bearing zone β of the formation. In another embodiment, the oil and gas bearing zones, Δ and β respectively, are both perforated, followed by performing the method the invention.

In a preferred embodiment of the invention, the method of sequential injections comprise injecting a first reactant of an alkaline earth salt solution through a perforated well bore having a gas zone above an oil bearing zone. Preferably, the pressure should be less than the pressure required to fracture the formation, as no further fracturing in this stage of production is desirable. The first reactant of alkaline earth salt is typically either a $CaCl_2$ or $MgCl_2$ aqueous solution having a salt concentration of between about 1 to 10%, preferably 4 to 6% by weight based upon the total weight of fluid. Enough of the first reactant is injected into the well bore at a sufficient pressure to infuse the alkaline earth salt solution throughout the desired portion of the exposed formation.

The next step typically involves injecting a spacer solution. The spacer solution is designed to prevent premature reaction of the two reactants. "Premature" is defined herein as occurring in the tubulars or immediately at the perforations into the formation. The spacer solution can be an aqueous KCl solution where the salt is present in the range from about 1 to 6% preferably about 2 to 4% by weight, based upon the total weight of fluids. The injection of the solutions can be done in sequence such that time elapses between the first reactant injection and the injection of the spacer, or in immediate sequence such that the KCl solution is layered above the prior alkaline earth salt solution. Minimal mixing is desirable so as to not dilute the alkaline earth salt solution. The spacer solution also acts to disperse and evenly distribute the alkaline earth salt throughout the formation. The more spacer that is used, the greater distribution of the salt is achieved, and the more even and complete the precipitation reaction between the salt and fatty acid component. Thus, the amount of reaction desired can be advantageously controlled by the size (volume) of spacer used.

The second reactant is an aqueous dispersion of an oil soluble fatty acid component which is injected into the well bore, either in immediate sequence, after the spacer, or delayed by some time. The fatty acid component typically comprises at least one fatty acid, most preferably a fatty acid resin. The fatty acid component can also comprise a mixture of fatty acids, isopropyl alcohol, $NH_4OH$, and so called tall oils or rosin. "Tall oils", as referred to in the present disclosure, are a mixture of fatty acid condensates with glycerol, often partially (two hydroxyl groups) hydrolyzed, and other organic compounds. The fatty acids may have more than one carboxylic acid within the structure, hence may still have a free acid moiety after condensation with glycerol. The fatty acids condensed with the glycerol (or fats) can be the same or different, thus resulting in compounds of varying molecular weight and physical properties.

Tall oils are typically of a natural origin. They are often mixtures of free fatty acids along with smaller amounts of other compounds such as acid esters (with glycerol), anhydrides, unsaponified matter, and other organic acids. The other organic acids can be such acids as three-ring aromatic acids and other ring-structured acids of natural origin. Tall oil rosin is similar in nature to gum and wood rosins in composition and physical properties. The tall oil component of the second reactant can be added to change the properties of the second reactant as desired.

The general chemical formula for a fatty acid is $CH_3(CH_2)_nCOOH$, where n is typically between 12 and 24. Preferably, the fatty acid component used in the present invention has at least one fatty acid having between 12 and 20 carbons (n=10–18) in the chemical structure. Further, the fatty acids used in the resin of the invention are preferably unsaturated.

Some common fatty acids useful as the fatty acid component of the invention are those selected from the group consisting of lauric acid $\{CH_3(CH_2)_{10}COOH\}$, palmitic acid $\{CH_3(CH_2)_{14}COOH\}$, stearic acid $\{CH_3(CH_2)_6COOH\}$, oleic acid $\{CH_3(CH_2)_7CH=CH(CH_2)_7COOH\}$, linoleic acid $\{CH_3(CH_2)_4CH=CHCH_2CH=CH(CH_2)_7COOH\}$, linolenic acid $\{CH_3CH_2CH=CHCH_2CH=CHCH_2CH=CH(CH_2)_7COOH\}$, eleostearic acid $\{CH_3(CH_2)_3CH=CHCH=CHCH=CH(CH_2)_7COOH\}$, licanic acid $\{CH_3(CH_2)_3CH=CHCH=CHCH=CH(CH_2)_4CO(CH_2)_2COOH\}$, ricinoleic acid $\{CH_3(CH_2)_5CHCOHCH_2CH=CH(CH_2)_7COOH\}$, palmitoleic acid $\{CH_3(CH_2)_5CH=CH(CH_2)_7COOH\}$, petroselenic acid $\{CH_3(CH_2)_{10}CH=CH(CH_2)_4COOH\}$, vaccenic acid $\{CH_3(CH_2)_5CH=CH(CH_2)_9COOH\}$, and erucic acid $\{CH_3(CH_2)_7CH=CH(CH_2)_{11}COOH\}$. It is to be understood that the invention is not limited to any particular fatty acid structure, carbon number, or additional functional group. The above description and list is only meant to be representative of the preferred types of fatty acids to be incorporated into the fatty acid resin, or as part of the condensation product with glycerol to produce the tall oil (rosin).

Figure 5:
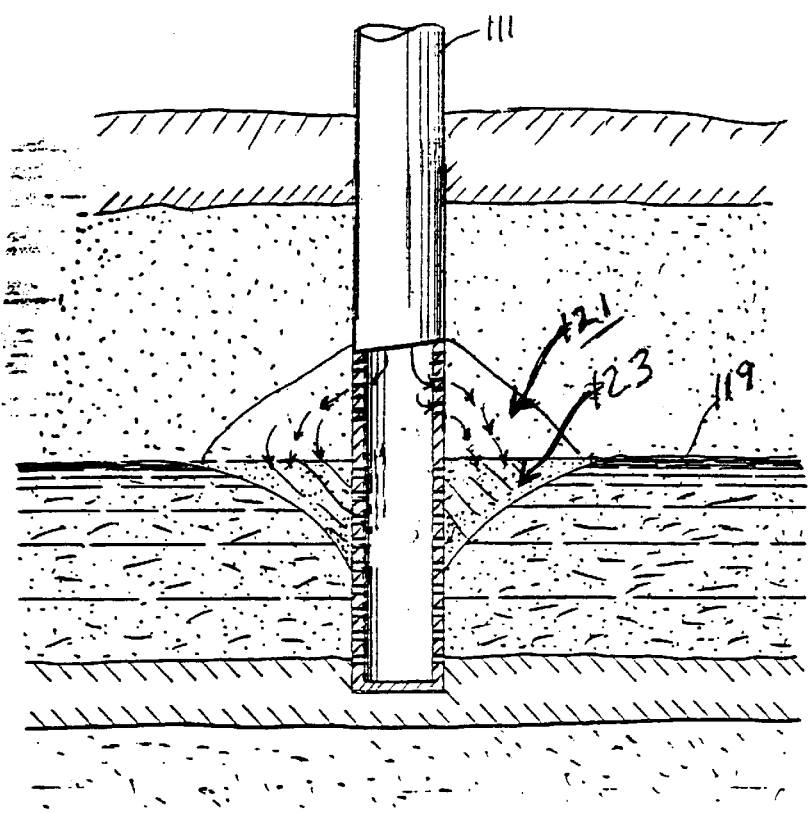
FIG. 5 is a view similar to FIG. 4 but showing the injection of the fluids of the invention into a selected region above the area of the gas coning.

The first and second reactants of the invention react in situ, within the formation to form a resin/cation precipitate. The divalent cations (e.g., $Mg^{2+}$ or $Ca^{2+}$) in the first reactant solution typically react with the carboxylic acid functional groups on the fatty acids in the resin and precipitate into a gum material. The spacer keeps the reactants separated until they reach the cone via the upper gas zone. Once in the cone, they react to form precipitate. As shown in FIG. 5, the precipitate is allowed to fall by gravity through a selected region 121 of the gas bearing zone into a selected region of the oil bearing zone to thereby form a sealed zone 123 within the hydrocarbon bearing formation β. Ideally, the sealed zone 123 is at or near the interface 119 of the gas zone (or gas cap) Δ and oil zone β to form a donut-shaped cap in the zone 123 around the well bore at the gas and oil interface.

Figure 6:
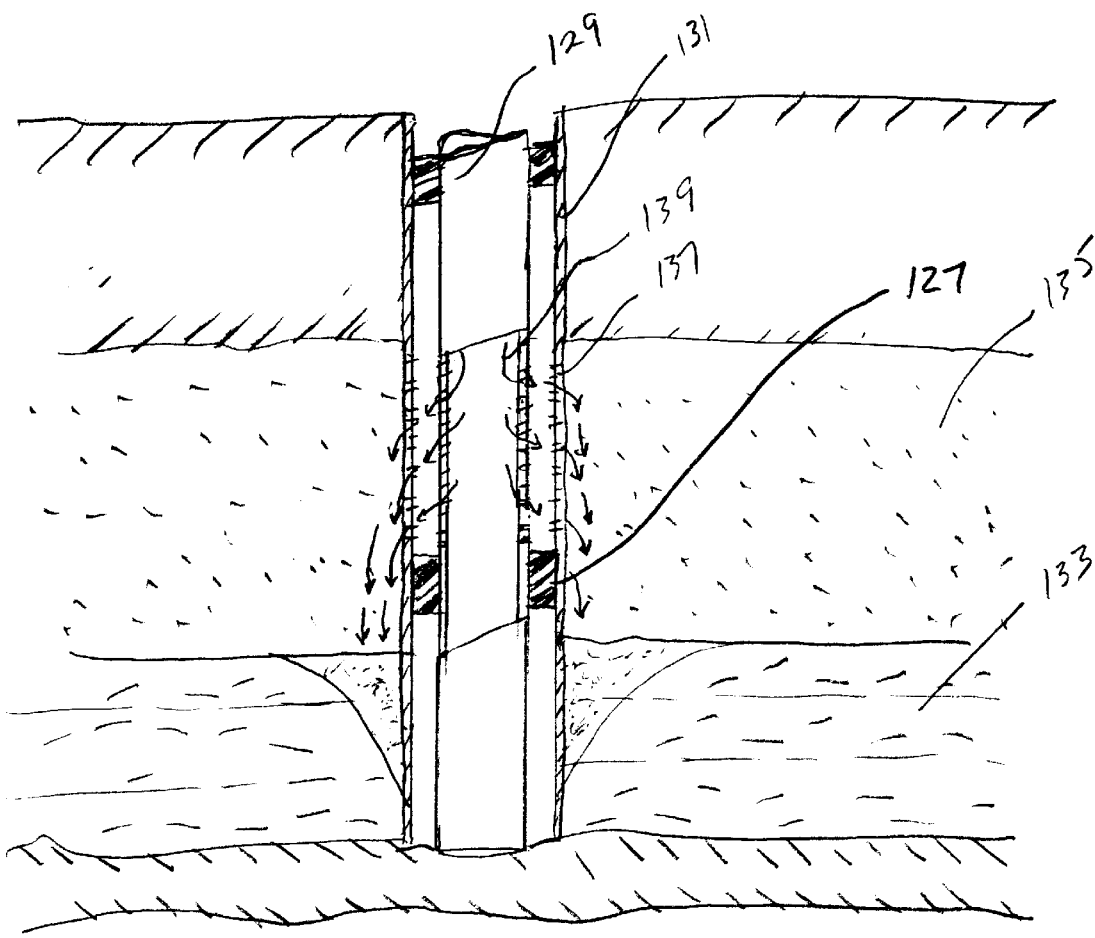
FIG. 6 is a view similar to FIG. 5, but showing the injection of the fluids of the invention into the gas zone, the oil bearing zone being initially isolated by a well packer.

FIG. 6 shows the use of a well bore packer 127 placed between the well production tubing or work string 129 and the well casing 131. The packer 127 isolates the oil zone 133 from the gas zone 135. The casing 131 has been perforated at 137 and the sequential reactant fluids 139 are pumped down the string 129 and through the perforations 137.

The resin/cation precipitate is advantageously oil soluble. This is ideal since it may be difficult to direct the location of the precipitation reaction within the well bore, especially where there are multiple perforations. Thus, oil can be produced from the oil bearing zone through the well bore, the fatty acid resin precipitate being allowed to gradually dissolve in the hydrocarbon present in the oil bearing zone as oil is being produced.

Figure 1:
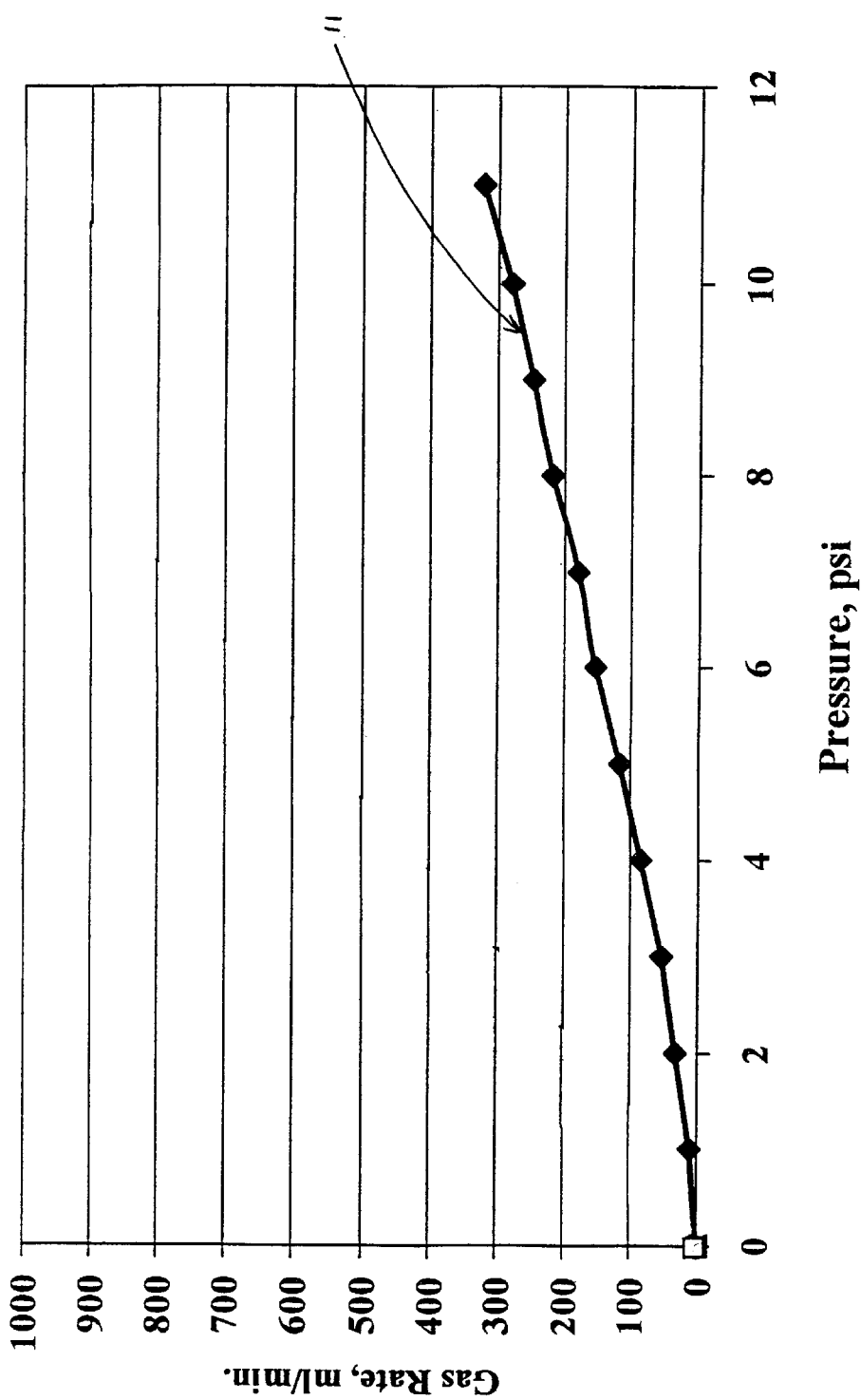
FIG. 1 is a graphical representation of data taken from gas pressure experiments in a column of sand testing the method of the invention, the sand column pressure given being prior to treatment with first and second reactants.

Laboratory scale experiments have been performed using the method of the invention. The data from these experiments are represented in graphs in FIGS. 1 through 3, and referred to in the discussion to follow. In the experiment, a sand pack consisting of 100 Mesh sand in 48 inch length pipe with 1 inch diameter was prepared. The pipe is set up such that liquid and gas pressure can be applied to the top of the column of sand while injecting the desired reactants and other substances. Brine was first pumped through the column of sand to saturate the column with water. Next, nitrogen was then pumped through the pack, and the gas rate was measured as a function of pressure as shown in FIG. 1, wherein line 11 represents the data where gas is purged through the pre-reacted sand column.

Next, two pore volumes (a pore volume being the fluid-fillable space between the grains of dried sand in the sand column) of 5 percent $CaCl_2$, by weight, was pumped through the column. The $CaCl_2$ is the first reactant of the invention. A spacer solution of 2 percent KCl by weight was then pumped through the column. Next, the second reaction dispersion of fatty acid resin (described in detail below) was pumped into the solution, and allowed to react (shut in) for a period of time. Nitrogen was then pumped through the treated column of sand to measure the gas rate through the column. The gum formed from the in situ reaction between the $CaCl_2$ and the resin halted gas flow to variable extents. When two pore spacer volumes were pumped through the column, there was almost no gas flow through the sand as shown in line 13 of FIG. 2. When one pore spacer volume is used prior to adding the second reactant, there was a small amount of gas flow as shown in line 15 of FIG. 2. When ½ pore spacer volume was added prior to adding the second reactant, there was an appreciable flow of nitrogen as shown in line 17, the rate reaching 500 ml/min at about 11 psi of nitrogen. Thus, the amount of pore spacer effects the amount of gas blockage in the sand and hence the gas permeability.

Figure 2:
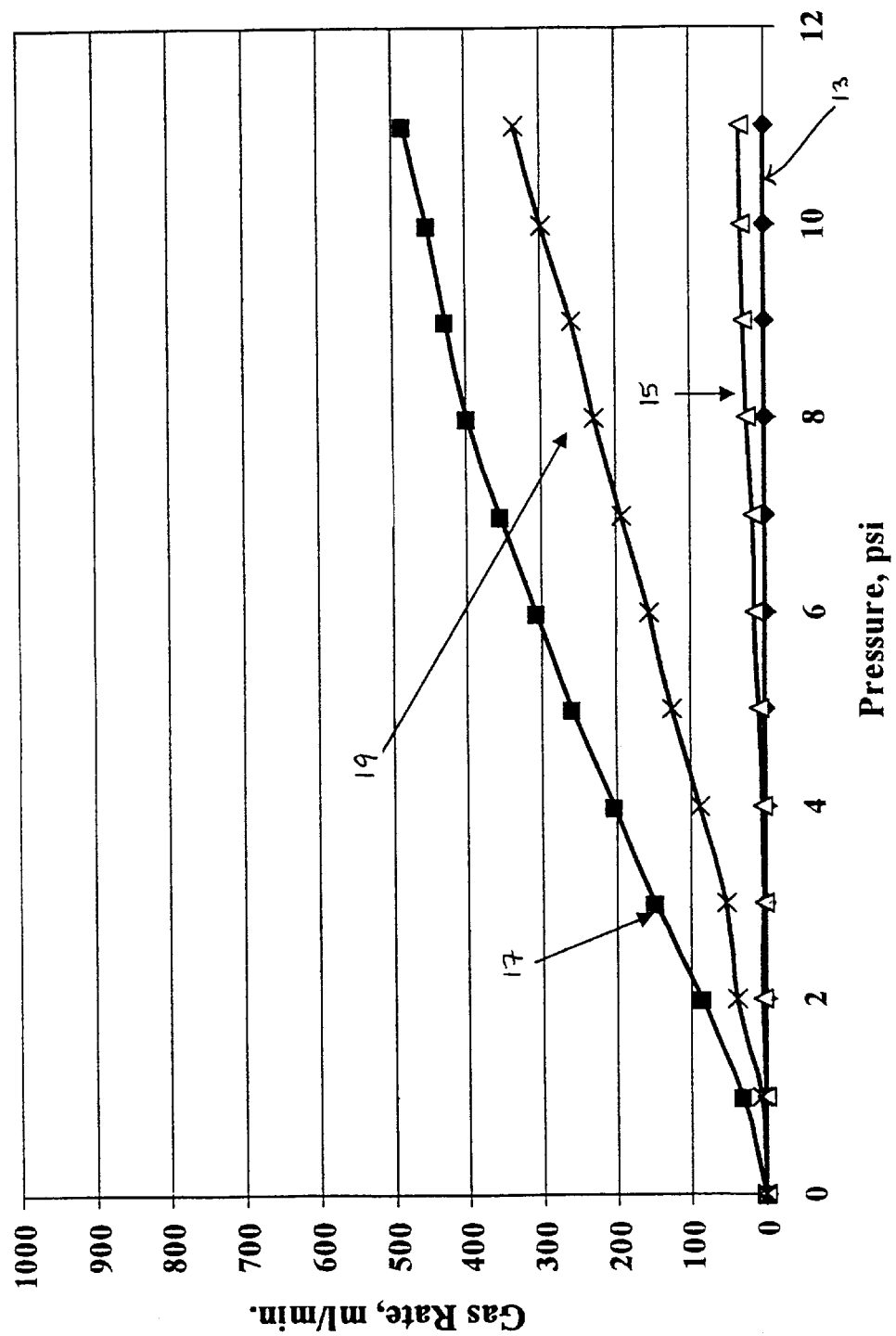
FIG. 2 is a graphical representation of data taken from gas pressure experiments in a column of sand testing the method of the invention, the sand column pressure given being after treatment with first and second reactants with various pore volumes of spacer.

The oil-solubility of the reaction product is demonstrated in line 19 of FIG. 2. After the in situ reaction was complete, the column of sand was rinsed with xylene. The gas flow was then measured, and found to be nearly identical to that of line 11 in FIG. 1, prior to the in situ reaction of the invention. This is a desirable characteristic of the invention in that the hydrocarbons in the formation can dissolve the gum precipitate that forms in oil producing perforations and fissures. Thus, even if the initial injection of the reactants is not directional, the gum plug that is formed in the cation/resin reaction is ultimately limited to the gas producing zone in the formation.

Figure 3:
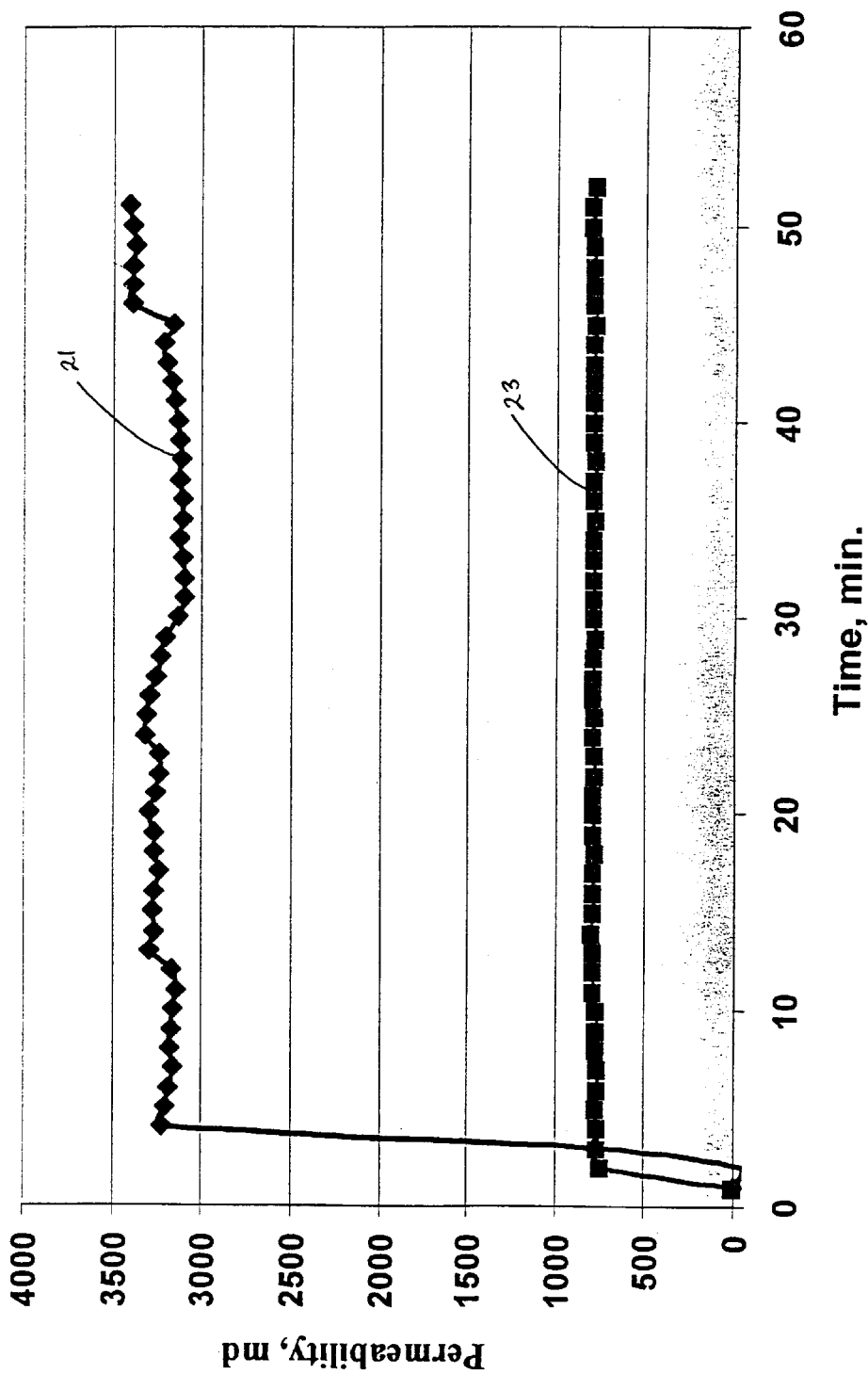
FIG. 3 is a graphical representation of data taken from gas pressure experiments in a column of sand testing the method of the invention and illustrating the gas permeabilities achieved by the method.

The gas permeability of sand treated by the method of the invention is shown with respect to FIG. 3, wherein line 21 represents data of nitrogen purge through a sand column prior to treatment with the method of the invention, and line 23 represents data of nitrogen purge after the method of the invention has been carried out. The permeability was nearly constant for almost an hour, thus indicative of the non-solubility of the gum product being insoluble in the gas. This is advantageous in that the sealing zone created by the method of the invention is thus maintained for a prolonged period of time to ensure maximum oil production. However, if necessary, the method of the invention can be carried out repeatedly in a well bore if permeability increases to an undesirable rate.

As has been mentioned, the fatty acid resin used as the second reactant of the invention can be of various compositions. It at least comprises one fatty acid that is dispersed in water. There can also be more than one fatty acid in the dispersion, forming a homogeneous mixture. In one particularly preferred embodiment of the resin of the invention, the resin can comprise a mixture of fatty acids, isopropyl alcohol, $NH_4OH$, and tall oil (or rosin). In this embodiment of the invention, the $NH_4OH$ can be between about 5 and 15 percent by weight of total composition. The isopropyl alcohol is preferably present in the range from between about 40 and 60 percent by weight of the total composition. The fatty acid component typically makes up between about 20 and 50 percent by weight of total composition, and the tall oil/rosin component preferably makes up between about 10 and 20 percent by weight of total composition. When a tall oil is present, the second reactant is mixed thoroughly to create a fine aqueous emulsion.

One specific rosin that can be used is called DYMEREX® Modified Resin (Hercules Incorporated, Wilmington, Del.). It has an average molecular weight of 502 and density of 1.069 kg/L. The softening point of this rosin is 143° C., and the acid number is 145. This can be used with the other components or alone with the fatty acids discussed above to form the second reactant dispersion. When the DYMEREX® is present in the second reactant, the second reactant is a fine aqueous emulsion.

As has been mentioned, the second reactant of fatty acid resin is preferably provided in the form of an aqueous dispersion. Fatty acids typically form dispersions in water. Any oil-soluble components in the second reactant, such as the rosin component if present, are dispersed as a fine emulsion. In this regard, fatty acids are also anionic surfactants in that the hydrocarbon tails of the molecules tend to be oil soluble, while the negatively charged carboxylic acid group or groups of the molecule of fatty acid tend to be water soluble. Upon reaction, the first and second reactants form an oil soluble precipitate as follows:

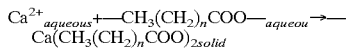

wherein $CaCl_2$ in water is the first reactant, and a fatty acid resin having a fatty acid with n carbons is the second reactant.

The reaction is extremely rapid, thus little shut in time is required. The solid is preferentially oil soluble so that the hydrocarbons within the formation can dissolve the solid that precipitates into the oil bearing perforations of the formation. For example, calcium iodostearate {Ca$(C_{17}H_{34}ICO_2)_2$}, a derivative of stearic acid, and calcium palmitate {Ca$(C_{16}H_{31}CO_2)_2$}, are highly insoluble in water or alcohol, but soluble in benzene, ether, or chloroform. (The Merck Index of Chemicals and Drugs, $12^{th}$ ed. 1996). Thus, the precipitate from the in situ reaction of the invention will dissolve in the hydrocarbons within the formation.

There are several advantages to the present invention. The present method allows for conservation of gas pressure within a formation, thus increasing the production of the well. The oil-soluble nature of the reactant product, or calcium-fatty acid precipitate, allows the hydrocarbons in the well to escape while maintaining the sealing zone at the gas interface. This gives the invention more directionality and selectivity than injecting polymers into the formation.

The present invention is relatively simple to implement and low cost. No special equipment is required to inject the reactants into the formation. Further, the solubility and reactivity is not highly temperature sensitive. Hence, the method of the invention is highly adaptable to a range of temperatures that can be encountered in well formations. The reaction takes place at a large range of pH, thus not being effected by prior or subsequent acid treatment.

Another advantage to the method of the present invention is the low viscosity of the individual reactants that can be achieved. The injection of polymers and asphalt into the well bore offers the problem of non-Newtonian fluid dynamics which can change with time as the polymerization reaction proceeds. The use of less viscous materials, such as the first and second reactants of the invention act, provides as system which behaves as Newtonian fluids. Thus, the flow of reactants is predictable and simple to control. If a more viscous reactant is desired, the viscosity can be increased by methods know in the art.

While the invention has been shown in only one of its forms, it is not thus limited but is susceptible to various changes and modifications without departing from the spirit thereof.

What is claimed is:

1. A method of preventing gas breakthrough in a hydrocarbon bearing formation comprising sequential injections of reactants, the method comprising:

injecting a first reactant of a salt solution through a perforated well bore having a gas zone above an oil bearing zone;

injecting a second reactant of an oil soluble fatty acid component through the well bore;

allowing the salt solution and oil soluble fatty acid component to react and create a sealed zone;

producing oil from the oil bearing zone through the well bore; and wherein the product of the reaction between the salt solution and the fatty acid component is soluble in the hydrocarbon present in the oil bearing zone.

2. The method of claim 1, wherein the fatty acid component comprises at least one fatty acid having between 12 and 20 carbons in a carbon backbone.

3. The method of claim 2, wherein the fatty acid component is selected from the group consisting of lauric acid, palmitic acid, stearic acid, oleic acid, linoleic acid, linolenic acid, eleostearic acid, licanic acid, ricinoleic acid, palmitoleic acid, petroselenic acid, vaccenic acid, and erucic acid.

4. The method of claim 1, wherein the salt solution is an alkaline earth salt solution, the salt being selected from the group consisting of $CaCl_2$ or $MgCl_2$.

5. The method of claim 1, wherein the fatty acid component further comprises at least one tall oil.

6. A method of preventing gas breakthrough in a hydrocarbon bearing formation comprising sequential injections of reactants, the method comprising:

injecting a first reactant of a salt solution through a perforated well bore having a gas zone above an oil bearing zone;

injecting a second reactant of an aqueous dispersion of a fatty acid resin through the well bore;

allowing the salt solution and fatty acid resin dispersion to react and create a sealed zone;

producing oil from the oil bearing zone through the well bore; and wherein the injection within the well bore is directed towards the gas zone to create the sealed zone between the oil bearing zone and the gas zone.

7. A method of preventing gas breakthrough in a hydrocarbon bearing formation comprising sequential injections of reactants, the method comprising:

injecting a first reactant of a salt solution through a perforated well bore having a gas zone above an oil bearing zone;

injecting a second reactant of an aqueous dispersion of a fatty acid resin through the well bore;

allowing the salt solution and fatty acid resin dispersion to react and create a sealed zone;

producing oil from the oil bearing zone through the well bore; and wherein the salt solution is an alkaline earth salt solution and wherein the alkaline earth salt is present in a concentration of between about 4 and 6 percent by weight based upon the total weight of alkaline earth salt solution.

8. A method of preventing gas breakthrough in a hydrocarbon bearing formation comprising sequential injections of reactants, the method comprising:

injecting a first reactant of a salt solution through a perforated well bore having a gas zone above an oil bearing zone;

injecting a second reactant of an aqueous dispersion of a fatty acid resin through the well bore;

allowing the salt solution and fatty acid resin dispersion to react and create a sealed zone;

producing oil from the oil bearing zone through the well bore; and wherein the fatty acid resin is formed by the addition of $NH_4OH$ to at least one fatty acid.

9. A method of preventing gas breakthrough in a hydrocarbon bearing formation comprising sequential injections of reactants, the method comprising:

injecting a first reactant of a salt solution through a perforated well bore having a gas zone above an oil bearing zone;

injecting a second reactant of an aqueous dispersion of a fatty acid resin through the well bore;

allowing the salt solution and fatty acid resin dispersion to react and create a sealed zone;

producing oil from the oil bearing zone through the well bore; and wherein the fatty acid resin further includes isopropyl alcohol as a reactive constituent.

10. A method of preventing gas breakthrough in a hydrocarbon bearing formation comprising sequential injections of reactants, the method comprising:

injecting a first reactant of an alkaline earth salt solution through a perforated well bore having a gas zone above an oil bearing zone;

injecting a spacer solution into the well bore;

injecting a second reactant of an oil soluble fatty acid resin through the well bore;

allowing the alkaline earth salt and fatty acid resin to react to form a precipitate which creates a sealed zone;

producing oil from the oil bearing zone through the well bore; and wherein the product of the reaction between the salt solution and the fatty acid resin is soluble in the hydrocarbon present in the oil bearing zone.

11. The method of claim 10, wherein the fatty acid resin comprises at least one fatty acid having between 12 and 20 carbons in a carbon backbone.

12. The method of claim 11, wherein the fatty acid resin is selected from the group consisting of lauric acid, palmitic acid, stearic acid, oleic acid, linoleic acid, linolenic acid, eleostearic acid, licanic acid, ricinoleic acid, palmitoleic acid, petroselenic acid, vaccenic acid, and erucic acid.

13. The method of claim 10, wherein the salt solution is an alkaline earth salt solution, the salt being selected from the group consisting of $CaCl_2$ or $MgCl_2$.

14. A method of preventing gas breakthrough in a hydrocarbon bearing formation comprising sequential injections of reactants, the method comprising:

injecting a first reactant of an alkaline earth salt solution through a perforated well bore having a gas zone above an oil bearing zone;

injecting a spacer solution into the well bore;

injecting a second reactant of an oil soluble fatty acid resin through the well bore;

allowing the alkaline earth salt and fatty acid resin to react to form a precipitate which creates a sealed zone;

producing oil from the oil bearing zone through the well bore; and wherein the spacer solution is an aqueous solution of KCl in water, the KCl being present in the range from about 2–4% by weight, based upon the total weight of solution.

15. A method of preventing gas breakthrough in a hydrocarbon bearing formation comprising sequential injections of reactants, the method comprising:

injecting a first reactant of an alkaline earth salt solution through a perforated well bore having a gas zone above an oil bearing zone;

injecting a spacer solution into the well bore;

injecting a second reactant of an oil soluble fatty acid resin through the well bore;

allowing the alkaline earth salt and fatty acid resin to react to form a precipitate which creates a sealed zone;

producing oil from the oil bearing zone through the well bore; and wherein the salt solution is an alkaline earth salt solution and wherein the alkaline earth salt is present in a concentration between about 4 and 6 percent by weight based upon the total weight of alkaline earth salt solution.

16. A method of preventing gas breakthrough in a hydrocarbon bearing formation of a well comprising sequential injections of reactants, the method comprising:

initially isolating an oil bearing zone from a gas bearing zone in the well;

injecting a first reactant of an alkaline earth salt solution through a perforated section of the well bore adjacent the gas bearing zone;

injecting a spacer solution into the well bore behind the alkaline earth salt solution;

injecting a second reactant of an oil soluble fatty acid component through the well bore;

allowing the alkaline earth salt solution and fatty acid component to react and create a precipitate;

allowing the precipitate to fall by gravity through a selected region of the gas bearing zone into a selected region of the oil bearing zone to thereby form a sealed zone within the hydrocarbon bearing formation; and producing oil from the oil bearing zone through the well bore, the fatty acid precipitate being allowed to gradually dissolve in the hydrocarbon present in the oil bearing zone as oil is being produced.

17. The method of claim 16, wherein the spacer solution is an aqueous solution of KCl in water, the KCl being present in the range from about 2–4% by weight, based upon the total weight of solution.

18. The method of claim 16, wherein the fatty acid component comprises at least one fatty acid having between 12 and 20 carbons in a carbon backbone.

19. The method of claim 18, wherein the fatty acid component is selected from the group consisting of lauric acid, palmitic acid, stearic acid, oleic acid, linoleic acid, linolenic acid, eleostearic acid, licanic acid, ricinoleic acid, palmitoleic acid, petroselenic acid, vaccenic acid, and erucic acid.

20. The method of claim 16, wherein the salt solution is an alkaline earth salt solution, the salt being selected from the group consisting of $CaCl_2$ or $MgCl_2$.

21. The method of claim 16, wherein the salt solution is an alkaline earth salt solution and wherein the alkaline earth salt is present in a concentration between about 4 and 6 percent by weight based upon the total weight of alkaline earth salt solution.

22. The method of claim 16, wherein the fatty acid component comprises a mixture of fatty acids.

23. The method of claim 16, wherein the fatty acid component is formed by the addition of $NH_4OH$ to at least one fatty acid.

24. The method of claim 16, wherein the fatty acid component further includes isopropyl alcohol.

25. The method of claim 16, wherein the fatty acid component further comprises at least one tall oil.

* * * * *

UNITED STATES PATENT AND TRADEMARK OFFICE
CERTIFICATE OF CORRECTION

PATENT NO. : 6,419,017 B1
DATED : July 16, 2002
INVENTOR(S) : Arthur Steven Metcalf It is certified that error appears in the above-identified patent and that said Letters Patent is hereby corrected as shown below:

<u>Title page,</u>
Item [56], References Cited, U.S. PATENT DOCUMENTS, insert:
-- 2,713,906, 07/26/55 Allen
   3,616,858, 11/02/71 Raza
   3,779,315, 12/18/73 Boneau
   4,237,973, 12/09/80 Todd
   4,501,326, 02/26/85 Edmunds
   4,504,399, 03/12/85 Stapp
   4,524,828, 06/25/85 Sabins et al.
   4,537,918, 08/27/85 Parcevaux et al.
   4,561,501, 12/31/85 Shaw et al.
   4,569,393, 02/11/86 Bruning et al.
   4,657,944, 04/14/87 Bruning et al.
   4,673,038, 06/16/87 Sandiford et al.
   4,736,831, 04/26/88 Settlemeyer et al.
   4,860,828, 08/29/89 Oswald et al.
   4,903,767, 02/27/90 Shu et al.
   5,203,411, 04/20/93 Dawe et al.
   5,217,076, 06/08/93 Masek
   5,320,173, 06/14/94 Laramay et al.
   6,012,520, 01/11/00 Yu et al. --

Signed and Sealed this

Seventeenth Day of February, 2004

JON W. DUDAS
*Acting Director of the United States Patent and Trademark Office*